United States Patent [19] [11] 4,087,512
Reese et al. [45] May 2, 1978

[54] PROCESS FOR REMOVING SOLID ORGANIC MATERIAL FROM WET-PROCESS PHOSPHORIC ACID

[75] Inventors: Stanton L. Reese; William M. Leaders, both of Lakeland, Fla.

[73] Assignee: Uranium Recovery Corporation, Mulberry, Fla.

[21] Appl. No.: 777,659

[22] Filed: Mar. 15, 1977

Related U.S. Application Data

[63] Continuation of Ser. No. 617,150, Sep. 26, 1975, abandoned, which is a continuation-in-part of Ser. No. 301,766, Oct. 30, 1972, abandoned.

[51] Int. Cl.² ............................................. C01B 25/16
[52] U.S. Cl. ................................. 423/321 R; 423/320
[58] Field of Search ................... 423/319, 370, 321 R, 423/321 S; 209/16 C

[56] References Cited

U.S. PATENT DOCUMENTS

| 771,075 | 9/1904 | Kendall | 209/171 |
| 1,894,289 | 1/1933 | Wood | 423/321 |
| 2,461,813 | 2/1949 | Duke | 209/166 P |
| 3,032,195 | 5/1962 | Fenske | 209/166 |
| 3,148,140 | 9/1964 | Kaiser | 210/21 |
| 3,333,924 | 8/1967 | Hazen et al. | 423/321 |
| 3,619,161 | 11/1971 | Knarr et al. | 210/44 |
| 3,661,254 | 5/1972 | Sirianni et al. | 209/171 |
| 3,661,774 | 5/1974 | Masologites | 210/21 |
| 3,694,355 | 9/1972 | Visser et al. | 210/21 |
| 3,723,606 | 3/1973 | Klingelhoefer | 423/321 |

FOREIGN PATENT DOCUMENTS

280,969   7/1914   Germany .............................. 423/321

OTHER PUBLICATIONS

A. V. Slack, Phosphoric Acid, 1968, pp. 665, 668.
Blumer, Science, vol. 149, p. 722 (1965).
Triebs, Ann., vol. 517, p. 172 (1935).
Triebs, Ang. Chem., vol. 49, p. 682 (1936).
Ind. Eng. Chem. Proc. Des. Dev., vol. 11, #1-1972, Recovery of Uranium from Wetprocess Phosphoric Acid, Hurst et al.
Mass Transfer Operations, Treybal, 1968, pp. 400–410.
Organic Chemistry, Morrison et al., 1966, pp. 27, 28.
I & EC Fundamentals, Optimization of Operating Condix in a Packed Bed 4, Extraction Column, vol. 1, #1-1962, Moorhead.

Primary Examiner—O. R. Vertiz
Assistant Examiner—Eugene T. Wheelock
Attorney, Agent, or Firm—Fleit & Jacobson

[57] ABSTRACT

Wet-process phosphoric acid which is obtained by the acidulation of uncalcined phosphate rock with sulphuric acid and which typically contains 28–31% $P_2O_5$ and measurable amounts of solid organic materials, such as, for example 0.1% or more, is treated to remove the solid organic materials contained therein by intimately contacting the acid with a liquid hydrocarbon so that the aqueous is the continuous phase, resulting in the solid organic materials being taken up by the organic phase.

18 Claims, 2 Drawing Figures

PROCESS FOR REMOVING SOLID ORGANIC MATERIAL FROM WET-PROCESS PHOSPHORIC ACID

CROSS-REFERENCE TO RELATED APPLICATION

This application is a continuation of application Ser. No. 617,150, filed Sept. 26, 1975, now abandoned, which is a continuation-in-part of application Ser. No. 301,766, filed Oct. 30, 1972, now abandoned.

BACKGROUND OF THE INVENTION

This invention relates to the recovery of uranium from phosphate compounds and, more specifically, to the recovery of uranium from phosphoric acid produced by the acidulation of phosphate rock.

Most of the world's production of phosphate comes from marine phosphorites, and large deposits exist in Florida and the Western United States. These deposits generally contain from 50 to 200 ppm uranium (0.005 to 0.02%, or 0.1 to 0.4 pounds per ton). Although these concentrations are only 5% to 10% as high as those of commercially mined uranium ores, the vast extent of these deposits has made them of considerable interest as a uranium source for many years. It has been reported, for example, that mineable reserves of phosphate rock in the United States alone contain about 600,000 tons, or more than 1 billion pounds, of uranium.

During the early 1950's, considerable effort was directed toward methods of selectively leaching uranium from phosphate rock. However, it was found that alkaline leach methods were completely ineffective and that acid leaching required complete dissolution of the phosphate rock, consuming for example, several tons of sulfuric acid per pound of $U_3O_8$ recovered. By contrast, uranium ores in the western U.S. are primarily sandstone deposits containing 2-5 pounds of $U_3O_8$ per ton of rock. These ores are essentially insoluble in acid and the uranium can be dissolved selectively by a relatively mild acid or alkaline digestion.

A large and increasing portion of commercial phosphate production is converted first to a relatively dilute phosphoric acid by the so-called "wet-process" (as distinguished from the furnace process which produces elemental phosphorus by direct reduction of the ore). The producer first manufactures sulfuric acid, then uses it to digest the rock. The chemical reaction forms phosphoric acid and calcium sulfate. The latter is filtered out, providing enormous quantities of gypsum, a waste product, and leaving an impure acid stream typically containing about 30% $P_2O_5$. Most of the uranium in the original rock shows up in the 30% acid, and the various extraction processes have been developed to extract it therefrom. The 30% acid is generally evaporated to about 54% "merchant acid", which is either sold or used to manufacture a variety of products, chiefly fertilizers. The higher the acid concentration, the harder it is to extract the uranium, so the 30% stage is where the uranium extraction must take place. If uranium is not extracted, it ends up as a minor impurity in the various end products.

The 30% acid can be either "black" or "green". All of the phosphate rock contains measurable amounts of organic material such as humic acids. For example, Florida phosphate rock contains as much as 0.1% and more organic material, while western phosphate rock contains substantially more. When phosphate rock containing solid organic material is acidulated with sulfuric acid, the aqueous phase takes up the solid organic material which is of such small particle size that much of it passes through the gypsum filter. This organic material is extremely fine and has a very slow filtration rate. Accordingly, it is not economically feasible to filter the acid to remove it.

The organic material, or black particulate, causes emulsions during uranium extraction. Richard H. Kennedy in an AEC report entitled "Recovery of Uranium from Low Grade Sandstone Ores and Phosphate Rock" presented to the International Atomic Energy Agency panel in June, 1966, points out the seriousness of the emulsion problem, and that it was never satisfactorily solved in all the uranium separation operations to that date. This problem was again acknowledged in an AEC report of the Oak Ridge National Laboratory in October 1970 (ORNL-4572), and these emulsions continue today to be a serious problem to those interested in uranium separation. In particular, these emulsions will collect at the organic-aqueous interface in any solvent extraction process that utilizes an organic extractant. The volume of emulsion generated is often such that flooding occurs and the equipment must be shut down and cleaned out to remove the emulsion.

If the original organic content of the rock is too high to be tolerated in phosphoric acid production, the rock is calcined before digestion to burn out the organic content, and the acid comes out with a greenish tint. All acid produced from rock originating in the Western United States must be calcined to remove organic materials before dissolution because of the high organic content. This green acid is easier to process, but is more costly to produce. Also, up to 30% of the uranium is lost to the gypsum when the calcined rock is digested. Most central Florida rock, which has the highest uranium content, is processed to black acid.

The 30% acid leaving the filter is supersaturated with calcium sulfate in solution and additionally contains about 1 to 2% inorganic solids. If this acid is allowed to settle for several days, the inorganic solids along with the organic solids will settle to the bottom leaving a clear dark amber solution at the top. However, clarification by settling is not desirable in a phosphoric acid plant which typically produces 400 gallons per minute of phosphoric acid solution because of the vast storage facilities that would be required and the solids handling problems associated therewith. For example, in excess of sixty tons of inorganic solids are present in the filtered acid produced each day in a typical phosphoric acid plant. Since these solids will readily settle out, it is the practice in the industry to agitate all tanks in which the acid is stored to keep the solids suspended.

Accordingly, it is an object of the present invention to provide a process for removing solid organic material from wet-process phosphoric acid.

A further object of the present invention is to provide an efficient process for removing solid organic material from wet-process phosphoric acid.

A still further object of the present invention is to provide a process for removing solid organic material from wet-process phosphoric acid which is economical and minimizes the consumption of costly reagents.

Other objects and advantages of the present invention will be apparent upon reading the undergoing specification and claims.

SUMMARY OF THE INVENTION

These and other objects are accomplished according to the present invention wherein the solid organic materials such as humic acids contained in wet-process phosphoric acid from uncalcined rock are first removed by contacting the acid with a liquid hydrocarbon so that the solid organic materials are suspended in an emulsion within the hydrocarbon phase.

When this process for removing solid organic material from wet-process phosphoric acid was first discovered, it was believed that the liquid hydrocarbon must be the continuous phase. This conclusion was based on the fact that an excess of hydrocarbon was employed in these early experiments and it was therefor assumed that the hydrocarbon was the continuous phase. Accordingly, in the grandparent application, the volume ratio of the hydrocarbon to the wet-process phosphoric acid was stated as being 1.5:1, and preferably 2 to 3:1, with a lower ratio being usable so long as the organic phase was continuous.

Recent experiments have demonstrated, however, that the system tested was actually aqueous continuous even though an excess of hydrocarbon was used because of the peculiarities of the mixing pump and the fact that the wet-process phosphoric acid was usually started through the mixing pump first. Further, experiments have now shown that although an excess of hydrocarbon can be used under certain circumstances, the best results are obtained using an excess of phosphoric acid. Accordingly, in order to ensure that the mixing is always aqueous continuous, the volume ratio of the wet-process phosphoric acid to the hydrocarbon should be at least 1:1 and preferably 2:1. As used herein, the term aqueous continuous phase or mode refers to a dispersion of organic droplets in the aqueous phase.

By this process, in excess of 95% by weight of the organic solids can be removed resulting in a residual emulsion concentration of about 0.04 to 0.08% by volume which will be encountered during uranium extraction. By contrast, as much as 20 to 25% by volume emulsion will be encountered during extraction of black acid if the organic solids are not first removed or settled. Accordingly, the frequency of flooding and the necessity for stopping the extraction process and cleaning out the emulsion is greatly reduced.

DESCRIPTION OF THE PREFERRED EMBODIMENTS

Figure 1:
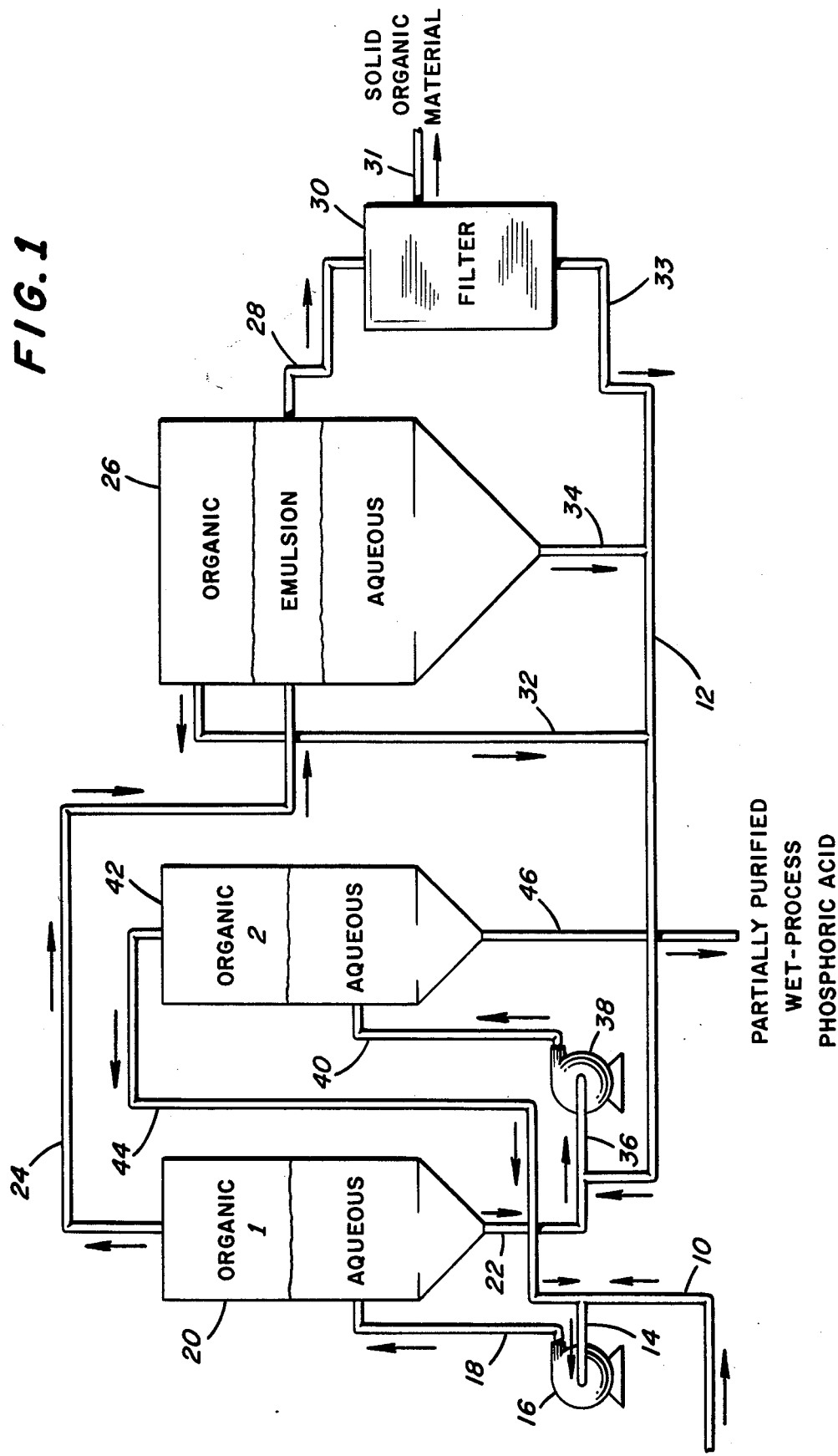
FIGS. 1 and 2 are schematic flow sheets illustrating the purification procedure in accordance with the present invention whereby the solid organic materials are removed from wet-process phosphoric acid.

In accordance with the present invention, wet-process phosphoric acid which is obtained by the acidulation of uncalcined phosphate rock with sulphuric acid and which typically contains 28–31% $P_2O_5$ and measurable amounts of solid organic materials, such as, for example 0.1% or more, is first treated to remove the solid organic materials contained therein. The solid organic materials inherently contained in wet-process phosphoric acid produced from uncalcined rock (black acid) such as humic acids are removed by intimately contacting the wet-process acid solution with a liquid hydrocarbon so that the aqueous is the continuous phase, resulting in the solid organic materials being taken up by the organic phase. The volume ratio of the aqueous phase to the hydrocarbon phase should be at least 1:1, and preferably 2:1. It should be appreciated, however, that a higher aqueous to organic volume ratio can be used, although the effectiveness of the cleaning will be reduced somewhat. For example, the aqueous to organic volume ratio can be as high as 5:1 or even 30:1. It should also be appreciated that the aqueous to organic volume ratio may be reduced somewhat so long as the aqueous phase remains continuous (i.e., dispersion of organic droplets in the aqueous phase). In particular, it has been found that the hydrocarbon to aqueous ratio can be as high as 1.5 to 2:1 when the wet-process phosphoric acid is fed to the mixing pump first, particularly when the hydrocarbon is aliphatic.

The term "liquid hydrocarbon" as used herein is intended to refer to hydrocarbons which are liquid at the temperatures normally encountered with freshly produced wet-process phosphoric acid (e.g., 55° to 70° C). In other words, the hydrocarbon should have a boiling point above about 70° C, and preferably above about 125° C, under atmospheric pressure. Also, it will be appreciated that the hydrocarbon employed should be essentially immiscible with wet-process phosphoric acid and have a substantially zero extraction coefficient for phosphoric acid and uranium so that essentially no phosphoric acid or uranium is extracted by the hydrocarbon. For optimal cleaning, the wet-process phosphoric acid solution and the liquid hydrocarbon should not have a temperature upon mixing of over about 70° C. Furthermore, for good phase separation, the mixture should not have a temperature below about 55° C.

Many liquid hydrocarbons, whether cyclic or acyclic, can be used to take up the solid organic materials from the wet-process acid. Thus, compounds such as alkanes, alkenes, alkynes and cyclic hydrocarbon compounds can be used. Preferably, such materials as hexane, kerosene, gasoline, benzene, toluene and commercial naphthene solvents are used because of their comparatively low cost and ready availability. The preferred hydrocarbons are refined high-boiling, high-flash point aliphatic or aliphatic-aromatic solvents with or without naphthenes.

Intimately contacting the phosphoric acid containing solid organic material with the hydrocarbon can be accomplished in any conventional manner. In this regard, it has been found that simply feeding the two streams into a single pipe and thereafter pumping the mixture with a conventional centrifugal pump sufficiently mixes the two phases to accomplish the desired separation. However, other methods for intimately contacting the two phases can be employed. In any event, it is preferred that the phosphoric acid be fed to the mixing pump first to ensure an aqueous continuous mode, particularly at low aqueous to organic volume ratios.

After the hydrocarbon and aqueous phases have been intimately admixed, they are transferred to a suitable vessel that acts as a separator. After about 5 to 10 minutes, the mixture separates into two phases, an aqueous phase and a hydrocarbon phase. The heavier aqueous phase, which separates to the bottom of the separator, is composed of the aqueous phosphoric acid solution substantially purified of its solid organic materials. This purified acid phase is then simply withdrawn from the bottom of the separator.

The lighter organic phase, which rises to the top of the separator, is composed predominantly of the hydrocarbon. This phase contains the solid organic material suspended therein as well as about 2% by volume of the phosphoric acid processed. This phase is also withdrawn from the separator thereby removing the solid organic material from the system and making room for additional mixtures of hydrocarbon and wet-process phosphoric acid.

The hydrocarbon phase withdrawn from the separator is preferably recycled for reuse. If this is done, it is also preferable to treat the dirty hydrocarbon phase to remove the solid organic material contained therein before the hydrocarbon is recontacted with fresh acid feed. This step improves the separation of the organic solids from the wet-process phosphoric acid when the hydrocarbon is reused.

Removing the organic solids from the hydrocarbon phase is easily accomplished by transferring the dirty hydrocarbon to a settling chamber where it can stand undisturbed. After a short period of time, the dirty hydrocarbon separates into three phases, a clean hydrocarbon phase, an aqueous acid phase, and an emulsion phase containing substantially all the solid organic material and a roughly equivalent amount of hydrocarbon and aqueous phosphoric acid. The hydrocarbon and the aqueous phosphoric acid recovered from the emulsion are then returned to the original acid feed hydrocarbon mixing unit.

In order to facilitate an easier understanding of the present invention, a flow sheet illustrating a preferred manner for removing organic solids from aqueous phosphoric acid solutions is provided in FIG. 1. Wet-process phosphoric acid enters the process through dirty acid feedline 10. This wet-process phosphoric acid is fresh black acid which has been diverted from the phosphoric acid production plant following filtration to remove by-product calcium sulfate. It contains not only the solid organic matter but also 1 to 2% suspended inorganic solids, principally calcium sulfate, which pass through the filter. To this dirty acid feed a hydrocarbon is added from hydrocarbon recycle line 44. The combined streams pass through line 14 to mixing pump 16 where the acid feed and the hydrocarbon are intimately admixed by the action of the pump. Next, the mixed hydrocarbon and aqueous phases containing the emulsified solid organic materials pass out of mixing pump 16 through line 18 and into separator 20.

In separator 20, the hydrocarbon phase and the aqueous phase separate with the lighter hydrocarbon phase and the emulsified solid organic materials rising to the top and the heavier aqueous phase and entrained inorganic solids settling to the bottom. In order to prevent inorganic solids accumulation in the separators, the bottom of the separators are conical as shown and form an angle with the horizontal of not less than 45°, preferably as much as 60°. The purified aqueous phosphoric acid phase and the inorganic solids are withdrawn from the bottom of separator 20 through line 22 and combined with the mixture in hydrocarbon recycle line 12. The hydrocarbon phase, which now contains the solid organic material suspended therein with minor amounts of phosphoric acid, overflows from the top of separator 20 into settling chamber 26 by means of hydrocarbon transfer line 24.

The hydrocarbon/phosphoric acid/solid organic material mixture, that is, the dirty hydrocarbon phase, separates into three phases in settling chamber 26. The lightest of these phases, which is composed of the hydrocarbons substantially free of phosphoric acid and solid organic materials, rises to the top of settling chamber 26. The heaviest of these phases, which is composed of aqueous phosphoric acid substantially free of hydrocarbon and solid organic material, sinks to the bottom of the tank. The third phase, which is composed of a relatively stable emulsion of the solid organic material, the aqueous phosphoric acid, and the hydrocarbon settles in between the clean hydrocarbon phase and the clean phosphoric acid phase.

As shown in FIG. 1, the emulsion in the settling chamber 26 is withdrawn by means of an emulsion withdrawal line 28 and transferred to filter 30. In filter 30, the solid organic material is removed from the filter through line 31 and the filtrate transferred to hydrocarbon recycle line 12 by means of filtrate return line 33.

The hydrocarbon separating to the top of the settling chamber 26 is transferred to hydrocarbon recycle line 12 by means of hydrocarbon return line 32. In addition, aqueous phosphoric acid separating to the bottom of the settling chamber 26 is transferred by means of phosphoric acid return line 34 to hydrocarbon recycle line 12. The filtrate, hydrocarbon and aqueous phosphoric acid are transferred by means of hydrocarbon recycle line 12 to line 36 where they are mixed with partially purified acid withdrawn from the bottom of separator 20.

The partially purified acid and entrained inorganic solids are withdrawn from the bottom of separator 20 and the mixture in hydrocarbon recycle line 12 are fed via line 36 through centrifugal pump 38 and are then transferred by means of line 40 into second separator 42. The purified acid product and entrained inorganic solids of this separator are withdrawn from separator bottom through line 46 and transferred to the extraction cycle. The hydrocarbon phase which has separated to the top of second separator 42 is withdrawn by means of hydrocarbon withdrawal line 44 and combined with the dirty acid feed entering through feed line 10 to accomplish this initial separation of organic solids from the dirty acid feed in mixing pump 16 and separator 20.

As will be readily appreciated by those skilled in the art, employment of two separators operated countercurrently improves the overall separation of the organic solids from the wet-process phosphoric acid feed since the partially purified acid produced by the first separator is contacted with completely fresh hydrocarbon for the second separation. In this regard, it should be appreciated that three, four or more separators operated as shown in FIG. 1 remove substantially all the organic solids from most wet-process phosphoric acid feeds. Also, it will be appreciated that the organic feed to both pumps 16 and 38 can be supplied from settler 26 directly, in which case overflow lines 24 and 44 will both lead directly to settler 26.

Figure 2:
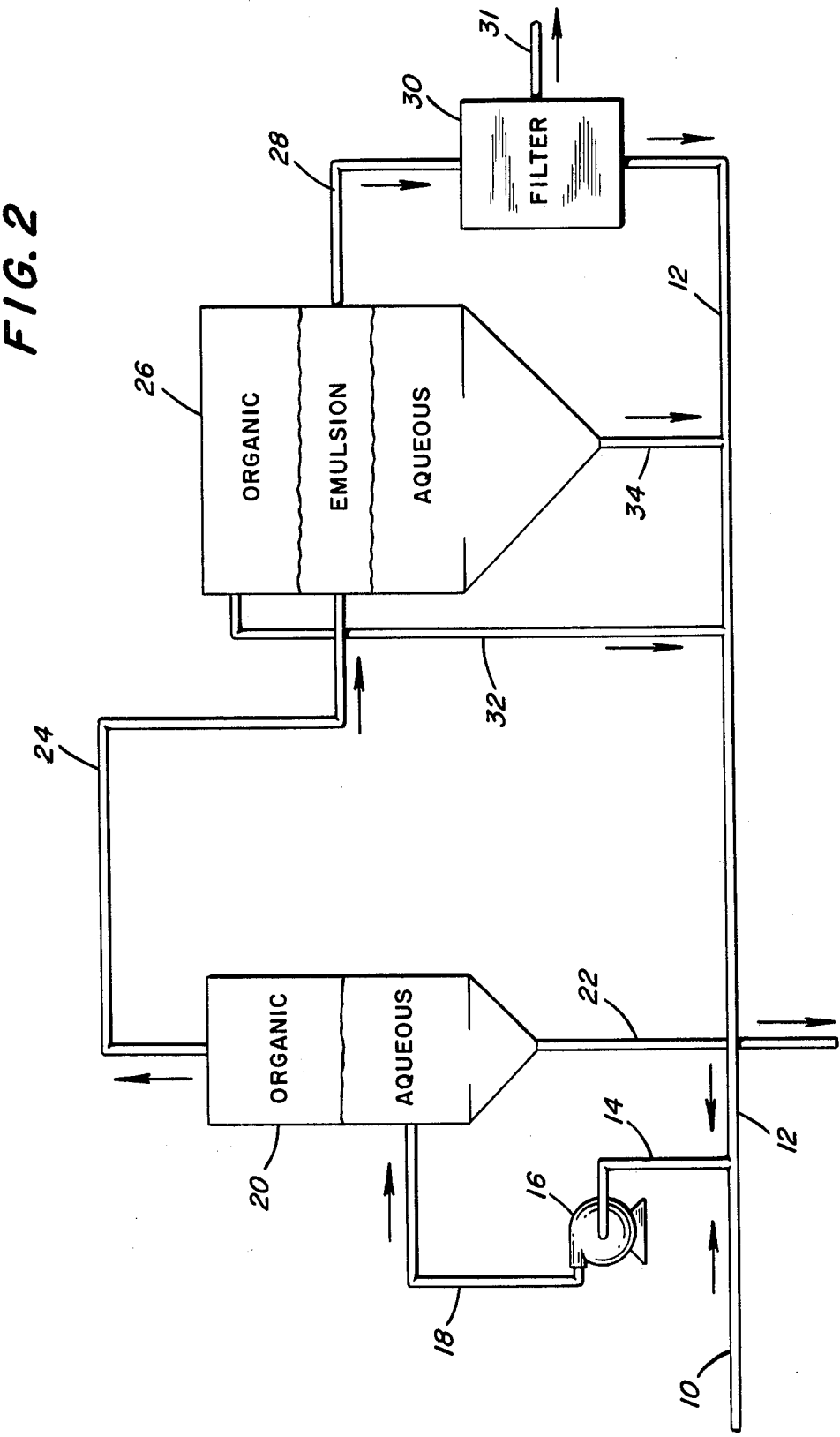

It should also be appreciated that the employment of two separators operated countercurrently, although being preferred, is not required and that only one separator can be used to remove the organic solids from the wet-process phosphoric acid feed. In this arrangement, pump 38 and separator 42 are omitted, purified aqueous phosphoric acid and entrained inorganic solids are transferred to the extraction cycle directly from the bottom of separator 20 through line 22, and hydrocarbon recycle line 12 feeds pump 16 rather than pump 38 as shown in FIG. 2. Otherwise, the operation of the systems is substantially the same.

After the original wet-process phosphoric acid has been purified of its organic solid material content as described above, the uranium is extracted from the wet-process acid and the acid is then returned to the phosphoric acid production plant to be evaporated to 54% "merchant acid". The extraction and recovery of uranium from the purified wet-process acid forms no part of the invention claimed herein and can be accomplished in any manner used in the art. For example, any hexavalent uranium in the wet-process acid can be reduced to the tetravalent state by the addition of iron and then extracted by contacting the acid with an organic extractant which has a high extraction coefficient ($Ea^o$) for uranium in the tetravalent state. As is known, the coefficient of extraction ($Ea^o$) is a measure of the extraction power of a reagent and is defined as the ratio of the concentration of uranium in the aqueous phase at equilibrium. After extraction, the uranium can be stripped of its uranium content, for example, by oxidizing the uranium in the organic extractant to the hexavalent state and then stripping the extractant with concentrated phosphoric or hydrochloric acid as shown in U.S. Pat. No. 2,859,092 to Bailes et al. The uranium can also be stripped from the organic extractant by means of oxidative stripping such as disclosed in U.S. Pat. No. 3,835,214 to Hurst et al. The uranium in the stripping solution can be recovered such as shown in the Bailes et al and Hurst et al patents.

Processes for extracting and recovering uranium employing organic extractants having a favorable extraction coefficient ($Ea^o$) for the extraction of hexavalent uranium from phosphoric acid can also be employed. When one of these extractants is used, the uranium can be stripped from the organic extractant by contacting the extractant with an aqueous solution containing compounds which react with hexavalent uranium to form uranyl compounds.

To facilitate understanding the advantages and operation of the present invention, the following example is provided to specifically illustrate the wet-process phosphoric acid purification of the present process and its attendant advantages.

EXAMPLE

A quantity of crude wet-process phosphoric acid produced by acidulating uncalcined phosphate rock from central Florida with sulphuric acid was obtained which contained about 0.2% organic solids by volume, about 1 to 2% inorganic solids by volume and about 30% $P_2O_5$ by weight. An apparatus was constructed according to the flow sheet of FIG. 1. Each separator had a capacity of 98 gallons while the settling chamber had a capacity of 500 gallons. Each centrifugal pump was capable of pumping 8 gallons per minute at full flow rate and the vacuum filter had a capacity of 2.5 gallons per hour. The settling chamber was filled with 250 gallons of refined kerosene and the centrifugal pumps were started with a feed of 3 gallons per minute of kerosene and 1 gallon per minute of the crude wet-process phosphoric acid. The system came to steady state in 40 minutes. Under these conditions, the flow rate of the crude phosphoric acid feed was about 1 gallon per minute. Partially purified phosphoric acid product which had an organic solids content of less than 0.02% by volume along with the inorganic solids exited the system at about 0.95 gallons per minute.

As will be readily understood by those of ordinary skill in the art, minor modifications may be made in the process described above without in any way departing from the spirit and scope of the invention. Accordingly, it is understood that the invention will not be limited to the exact details disclosed hereinbefore, but will be defined in accordance with the appended claims.

What is claimed is:

1. A process for removing solid organic material from wet-process phosphoric acid derived from the acidulation of uncalcined phosphate rock without otherwise altering the chemical composition of aqueous solution comprising:
   a. mixing the wet-process phosphoric acid with a liquid consisting essentially of one or more hydrocarbons at a temperature of not less than about 55° C nor more than about 70° C and at a volume ratio of aqueous to organic up to about 30:1 so that the aqueous phase is continuous to emulsify substantially all of said organic material in said liquid hydrocarbon;
   b. allowing the mixture to separate into an aqueous phase containing substantially all of the phosphoric acid and an organic phase containing substantially all of said solid organic material; and
   c. separating the phosphoric acid aqueous phase from the organic phase.

2. A process according to claim 1 wherein the volume ratio of the aqueous phase to the organic phase is at least 1:1.

3. A process according to claim 2 wherein said volume ratio is between 1:1 and 2:1.

4. A process according to claim 1 wherein said liquid hydrocarbon is hexane, kerosene, gasoline, benzene, toluene or naphthene solvents.

5. A process according to claim 1 wherein said liquid hydrocarbon is a refined high-boiling, high-flash point solvent.

6. A process according to claim 1 wherein the organic phase containing the solid organic material of steps (b) and (c) is treated to remove the solid organic material contained therein and thereafter recycled for contacting with fresh wet-process phosphoric acid.

7. A process according to claim 1 wherein said wet-process phosphoric acid has a concentration of about 28 to 31% $P_2O_5$.

8. A process according to claim 1 wherein said liquid hydrocarbon has a boiling point above about 70° C under atmospheric pressure.

9. A process according to claim 1 wherein said liquid hydrocarbon has a boiling point above about 125° C under atmospheric pressure.

10. A process according to claim 1 wherein said liquid hydrocarbon is essentially immiscible with said wet-process phosphoric acid and has a substantially zero extraction coefficient for said wet-process phosphoric acid.

11. A process for removing solid organic material from wet-process phosphoric acid containing uranium which is derived from the sulfuric acid acidulation of uncalcined phosphate rock comprising:
   a. intimately contacting said wet-process phosphoric acid with a liquid having a substantially zero extraction coefficient for uranium, said liquid comprising a liquid hydrocarbon, at a temperature of not less than about 55° C nor more than about 70° C so that the aqueous phase is continuous and the solid organic material is emulsified within said liquid hydrocarbon;
   b. allowing the mixture thus formed to settle in a first zone into a purified acid phase containing substantially all of the phosphoric acid and a liquid hydrocarbon phase containing substantially all of the solid organic material suspended therein;

c. withdrawing purified wet-process phosphoric acid from the purified acid phase of the first zone;

d. transferring a portion of the liquid hydrocarbon phase from said first zone to a second zone;

e. allowing the portion of the liquid hydrocarbon phase in said second zone to separate into an emulsion, a purified hydrocarbon phase and a phosphoric acid phase;

f. filtering said emulsion to obtain solid organic material and a filtrate; and g. recycling said filtrate, a portion of said purified hydrocarbon phase, and a portion of said phosphoric acid phase for contacting an additional amount of wet-process phosphoric acid containing solid organic material.

12. A process according to claim 11 wherein the recycle ratio of the recycle step is sufficient so that when said hydrocarbon is contacted with said wet-process phosphoric acid, the volume ratio of the wet-process phosphoric acid to the hydrocarbon is at least 1:1.

13. A process according to claim 12 wherein said volume ratio is about 1:1 to 2:1.

14. A process according to claim 12 wherein said hydrocarbon is a refined high-boiling, high-flash point solvent.

15. A process according to claim 11 wherein the material recycled in step (g) is mixed with the purified, wet-process phosphoric acid of step (c), the mixture thereby formed is allowed to separate into a second aqueous phase and a second organic phase, the second aqueous phase is withdrawn from the second organic phase, and the second organic phase is contacted with the wet-process phosphoric acid feed.

16. A process for removing organic solids from freshly produced wet-process phosphoric acid having a concentration of about 28 to 31% $P_2O_5$ and containing uranium, inorganic solids including calcium sulfate and organic solids including humic acid solids comprising intimately mixing the phosphoric acid with a liquid having a substantially zero extraction coefficient for uranium, said liquid comprising a liquid hydrocarbon, at a temperature of not less than about 55° C nor more than 70° C in a manner such that the aqueous phase is continuous, permitting the two phases to separate in a separator tank having a conical bottom which has an angle with the horizontal of not less than 45° and an aqueous outlet near the apex of the cone, removing the liquid hydrocarbon along with the emulsified organic solids and any entrained phosphoric acid overhead from the separator tank to a settling tank, permitting the organic solids to consolidate, recycling the liquid hydrocarbon, separating the organic solids from entrained phosphoric acid and liquid hydrocarbon by filtration and returning the filtrate to the process.

17. A process for removing solid organic material from freshly produced wet-process phosphoric acid having a concentration of about 28 to 31% $P_2O_5$ derived from the acidulation of uncalcined phosphate rock and containing uranium without otherwise altering the chemical composition of the aqueous solution comprising:

a. mixing the wet-process phosphoric acid with a liquid consisting essentially of one or more hydrocarbons at a temperature of not less than about 55° C nor more than about 70° C and at a volume ratio of aqueous to organic of about 1:1 to about 5:1 so that the aqueous phase is continuous to emulsify substantially all of said organic material in said liquid hydrocarbon, said liquid hydrocarbon having a boiling point above about 125° C under atmospheric pressure, said liquid hydrocarbon being essentially immiscible with said wet-process phosphoric acid and having a substantially zero extraction coefficient for said wet-process phosphoric acid and said uranium;

b. allowing the mixture to separate into an aqueous phase containing substantially all of the phosphoric acid and an organic phase containing substantially all of said solid organic material, said separation occurring within about 10 minutes after said mixing; and c. separating the phosphoric acid aqueous phase from the organic phase.

18. A process for removing solid organic material from freshly produced wet-process phosphoric acid having a concentration of about 28 to 31% $P_2O_5$ derived from the acidulation of uncalcined phosphate rock and containing uranium without otherwise altering the chemical composition of the aqueous solution comprising:

a. mixing the wet-process phosphoric acid with a liquid consisting essentially of one or more hydrocarbons at a temperature of not less than about 55° C nor more than about 70° C and at a volume ratio of aqueous to organic of about 1:1 to about 5:1 to emulsify said organic material in said liquid hydrocarbon, said liquid hydrocarbon being essentially immiscible with said wet-process phosphoric acid and having a substantially zero extraction coefficient for said wet-process phosphoric acid and said uranium;

b. allowing the mixture to separate into an aqueous phase containing substantially all of the phosphoric acid and an organic phase containing substantially all of said emulsified solid organic material; and c. separating the phosphoric acid aqueous phase from the organic phase.

* * * * *